United States Patent [19]

Kashiba

[11] Patent Number: 5,725,795
[45] Date of Patent: Mar. 10, 1998

[54] OXYGEN ABSORBER AND METHOD FOR PRODUCING SAME

[75] Inventor: Takashi Kashiba, Tokyo, Japan

[73] Assignee: Mitsubishi Gas Chemical Company, Inc., Tokyo, Japan

[21] Appl. No.: 593,169

[22] Filed: Feb. 1, 1996

Related U.S. Application Data

[63] Continuation of Ser. No. 426,474, Apr. 20, 1995, abandoned, which is a continuation of Ser. No. 974,889, Nov. 12, 1992, abandoned.

[30] Foreign Application Priority Data

Nov. 13, 1991 [JP] Japan ................... 3-296764

[51] Int. Cl.$^6$ ............................... C09K 15/02
[52] U.S. Cl. ............... 252/188.28; 252/194; 252/397
[58] Field of Search ............... 252/188.28, 194, 252/380, 397; 423/219

[56] References Cited

U.S. PATENT DOCUMENTS

| | | | |
|---|---|---|---|
| 3,855,307 | 12/1974 | Rony et al. | 252/426 |
| 4,036,928 | 7/1977 | Valenta | 264/118 |
| 4,127,503 | 11/1978 | Yoshikawa et al. | 252/429 |
| 4,192,773 | 3/1980 | Yoshikawa et al. | 252/429 |
| 5,241,149 | 8/1993 | Watanabe et al. | 219/10.55 E |

FOREIGN PATENT DOCUMENTS

| | | |
|---|---|---|
| 56-061981 | 5/1981 | Japan . |
| 56-121634 | 9/1981 | Japan . |
| 56-50618 | 11/1981 | Japan . |
| 58-128145 | 7/1983 | Japan . |
| 3202150 | 9/1991 | Japan . |
| 2006040 | 5/1979 | United Kingdom . |

*Primary Examiner*—Joseph D. Anthony
*Attorney, Agent, or Firm*—Leydig, Voit & Mayer, Ltd.

[57] ABSTRACT

By using diatomaceous earth as the moisture donor for solving the problems of the oxygen absorbers employing the conventional moisture containing materials, there are provided a practically excellent oxygen absorber capable of forming a compact oxygen absorber package with high cost performance and a higher oxygen adsorptivity at a less carrier content, and a method for producing the same. The oxygen absorber comprises iron powder, an oxidation accelating agent, a filler and a moisture donor produced by immersing diatomaceous earth having an adsorptivity showing a equilibrium humidity of 55% or more at a moisture content of 2% by weight in water or a humidifying agent. By using the diatomaceous earth having the specific adsorptivity as a moisture donors an oxygen absorber package can be prepared, having higher oxygen adsorptivity with a lower carrier content and being of a compact size to be placed in any location. Additionally, an oxygen absorber can be provided, being excellent in terms of safety and hygiene, low in cost, and allowing excellent practical application.

29 Claims, 1 Drawing Sheet

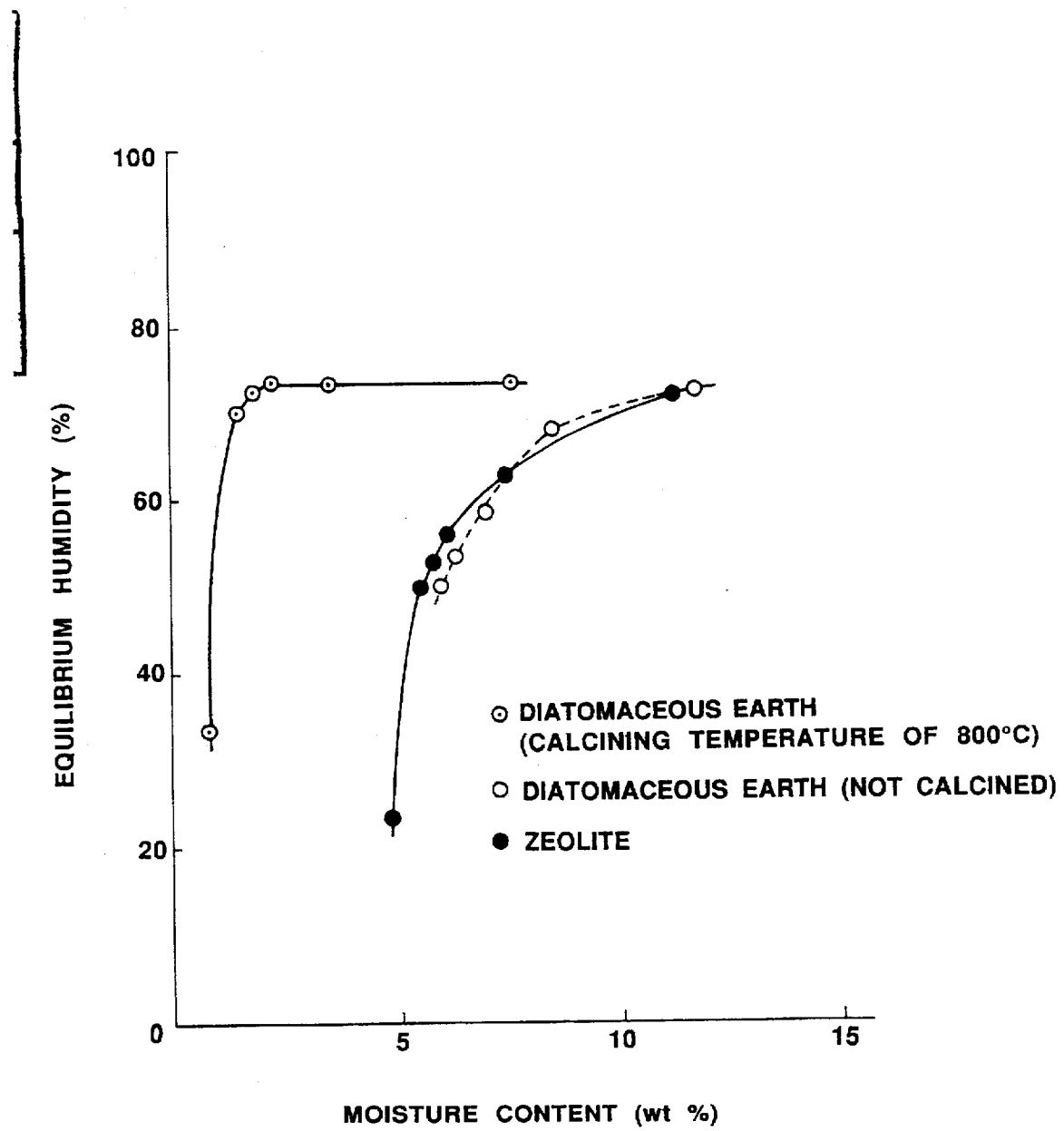

OXYGEN ABSORBER AND METHOD FOR PRODUCING SAME

This disclosure is a continuation of patent application Ser. No. 08/426,474, filed Apr. 20, 1995 now abandoned, which is a continuation of prior patent application Ser. No. 07/974,889, filed on Nov. 12, 1992, now abandoned.

BACKGROUND OF THE INVENTION

The present invention relates to an oxygen absorber for use in the quality maintenance of various subjects such as various foodstuffs and pharmaceutical agents, and a method for producing the same. More specifically, the present invention relates to an oxygen absorber comprising iron powder, an oxidation accelerating agent, a filler and a moisture donor produced by making diatomaceous earth having an adsorptivity showing an equilibrium humidity of 55% or more when it has a moisture content of 2% contain water or a humidifying agent; and a method for producing the same.

The use of an oxygen absorber package produced by packaging an oxygen absorber with a gas-permeable material has conventionally been utilized as one common food storage technique used. Recently, the range of articles with which the oxygen absorber package may be used has been enlarged and diversified, primarily, to include a greater variety of foodstuffs. In order to prepare a compact oxygen absorber package which can readily be placed in various storage containers and packages containing these storage subjects, the development of an oxygen absorber with a higher oxygen adsorptivity at lower amounts has been sought. Alternatively, the application of oxygen absorbers has been extended to cheaper foodstuffs and the like, so that a far cheaper oxygen absorber package is now demanded by the market.

From the viewpoint of these demands, the present inventors have improved conventional oxygen absorbers and have achieved the development of the excellent oxygen absorber of the present invention.

As the technology relating to the moisture donor of an oxygen absorber, Japanese Patent Examined Publication No.56-50618 discloses an oxygen absorber produced by sealing a halogenated metal-coated iron powder and a moisture-containing material in a gas-permeable packaging material. The publication illustrates as moisture-containing materials, those produced by immersing granular materials such as diatomaceous earth, pearlite, zeolite, activated alumina, activated charcoal, sand, activated clay and the like in water or humidifying solutions.

The moisture-containing material constituting one component of oxygen absorber serves as the so-called moisture donor which supplies necessary moisture for oxygen absorption by the iron powder, which serves as the principal component. Thus, the moisture carrier to be used in such moisture donors is selected from among adsorptive materials with higher water retention volume. Additionally, the possession by the carrier of an enhanced water retention volume is not by itself satisfactory. Sufficient increased adsorptivity is also essential. From the standpoint of safety hygiene, where an oxygen absorber is applied to a foodstuff with a high moisture content, water vapor from the food should not be absorbed and then subsequently released into the food. In order to automatically fill and package an oxygen absorber, the fluidity of the granular carrier is important. The aforementioned publication also describes a great number of moisture-containing materials, but the performance thereof is not necessarily satisfactory. Oxygen absorbers that do not contain zeolite, silica gel or pearlite have never been put to practical use.

Although even zeolite, which is used most frequently, has a large water retention volume, it is disadvantageous in that the moisture it contains is not effectively used. Because the equilibrium humidity drastically decreases at a relatively high moisture content (see FIG. 1), the moisture retained caused to be sufficiently vaporized, and therefore cannot contribute to oxygen absorption. Therefore, there is a problem with abrupt termination of oxygen absorption. In order to preliminarily prevent such problem, it is necessary to use a large amount of a carrier so that the carrier contains a sufficient moisture content for full oxygen absorption.

As has been described above, conventionally a large amount of carrier has been necessary, and hence, the amount of oxygen absorber used tends to be high. Thus, small-size packaging of oxygen absorber is difficult, which is a problem to be improved.

Furthermore, problems are suggested to exist in that zeolite has cation exchange potential so that the pH of the moisture donor increases only minimally even after an alkaline substance is added. It is substantially more difficult to support hydrogen generation during storage with oxygen absorbers that have iron powder as their principal component substantially hard to suppress hydrogen generation during storage.

Although the use of a diatomaceous earth as a moisture retention carrier for an oxygen absorber was described in the prior art, it has not drawn practical attention due to the following problems.

First, an ordinary diatomaceous earth only has a level of absorbtivity similar to the zeolite. Therefore it cannot be put to practical use as as a high-efficiency oxygen absorber, because it is impossible to use it to form a compact absorber.

Second, diatomaceous earth has a specific odor. Therefore, the practical use thereof has problems associated with application of diatomaceous earth to foods and the like, for which flavor retention is important, would cause reduction in the commercial value of such foods and other problems.

Third, although there was a description of a granule type diatomaceous earth in the cited patent, a powder type of diatomaceous earth is more common. The granule type diatomaceous earth is simply a by-product of manufacturing the powder type. Accordingly, it was difficult to produce the granule type for commercial use.

As a result of the thorough study of a high-efficiency oxygen absorber to solve the above problems, the present invention was achieved by using a diatomaceous earth having a specific adsorptivity as a moisture retention carrier for an oxygen absorber.

SUMMARY OF THE INVENTION

It is an objective of the present invention to solve the aforementioned problems of oxygen absorbers employing conventional moisture containing materials, by using diatomaceous earth having a specific adsorptivity as the moisture donor, and to provide a practical and excellent oxygen absorber capable of being used in a compact oxygen absorber package with high cost performance and a high oxygen adsorptivity with a smaller carrier content, which has high storage efficiency, less odor and which is safe and has good sanitary qualities, and a method for producing the same, as well as to provide an oxygen absorber which is not likely to generate hydrogen, and a method for producing the same.

The oxygen absorber in accordance with the present invention comprises iron powder, an oxidation accelerating agent, a filler and a moisture donor produced by making diatomaceous earth having an adsorptivity characterized by a equilibrium humidity of 55% or more at a moisture content of 2%.

The present invention will now be explained in detail.

As with the iron powder which is the principal component of the oxygen absorber in accordance with the present invention, any iron powder which exhibits an oxygen absorbing function may be used without specific limitation, including, for example, pure iron powder, cast iron powder, steel powder, reduced iron powder, spray iron powder, sponge iron powder, electrolytic iron powder and the like.

As the oxidation accelerating agent, halogenated products of alkali metals or alkaline earth metals, halogenated products of ion exchange resins, hydrochloric acid, hypochlorite and the like may be used. From the viewpoint of oxidation accelerating effect and safety and hygiene, halogenated products of alkali metals or alkaline earth metals, such as $NaCl$, $CaCl_2$, $MgCl_2$ and the like, are preferred.

The proportions of oxidation accelerating agent to the amount of iron powder is 0.01 to 20 parts by weight of accelerating agent to 100 parts by weight of iron powder.

As the method for adding an oxidation accelerating agent, the agent may be mixed with an oxygen absorber as pure halide or after it has been made into an aqueous solution, without any specific limitation. It is more effective and preferable to add the oxidation accelerating agent separately to the moisture donor side and the iron powder side.

Filler is added with the objective of improving the fluidity qualities of the oxygen absorber, dust suppression, odor removal, suppression of hydrogen generation by iron powder, and the like. More specifically, active charcoal, potassium carbonate, pearlite, zeolite, activated alumina, oxidized iron, alkaline earth metal hydroxides, gypsum, etc. may optionally be added if desirable.

The moisture donor of the oxygen absorber in accordance with the present invention is produced by adding water or an aqueous solution to diatomaceous earth, and has adsorptivity characterized by a equilibrium humidity of 55% or more at a 2% moisture content in the diatomaceous earth. As is apparent from FIG. 1 depicting the relation between moisture content and equilibrium humidity, water can be vaporized sufficiently from diatomaceous earth having such adsorptivity at a lower moisture content than has ever been observed to be the case with conventional carriers. Thus, the retained moisture contributes effectively to oxygen absorption even at low moisture content.

As the physical properties of diatomaceous earth vary depending on the type, manufacturing process and treatment methods, it is of importance to appropriately select the most appropriate one depending on the intended use.

Raw diatomaceous earth generated through the deposition of marine or freshwater Bacillariophyceae is processed through grinding, drying and calcining as such diatomaceous earth, for use.

Examples of marine Bacillariophyceae include coscinodiscus of genus Amime Bacillariophyceae, genus Stephanopyxis, cocconeis of genus Kometsubu Bacillariophyceae, and the like; examples of freshwater Bacillariophyceae include melosira of genus Tar Bacillariophyceae, genus Cyclotella, genus Stephanodiscus and the like. In accordance with the present invention, marine diatomaceous earth is preferred, and the marine diatomaceous earth from coscinodiscus of genus Amime Bacillariophyceae is more preferred.

In accordance with the present invention, powdery or granular diatomaceous earth obtained through a calcining process is used. The temperature for this calcining process is in the range of 500° C. or more to 1,500° C. or less, and preferably in the range of 650° to 1,300° C.

If the calcining temperature is low during the calcining process, the odor specific to diatomaceous earth is strong, and furthermore, it may not yield an adsorptivity characterized by equilibrium humidity of 55% or more at a necessary moisture content of 2%. If the temperature exceeds 1,500° C., alternatively, the fine pore of diatomaceous earth are crushed so that a product with a preferable pore volume can not be obtained and hence, it cannot hold the necessary moisture content.

Granular diatomaceous earth, if required, is produced by preparing powdery diatomaceous earth into granules which are then calcined, or by calcining and then granulating diatomaceous earth. Previously dried diatomaceous earth may be extruded and granulated, and then calcined, or, preferably, extruded and granulated diatomaceous earth may be calcined without drying.

Granular diatomaceous earth of a granule diameter of 0.2 to 3 mm, preferably 0.5 to 2 mm, is used in order to steadily maintain fluidity during filling and packaging the earth into a gas-permeable packaging material. In accordance with the present invention, the fluidity during water retention treatment is significant. By assessing the fluidity by a test method shown, for example, in Example 1, the diatomaceous earth with a high water retention volume is used.

In the case of powdery diatomaceous earth, powdery diatomaceous earth is mixed with iron powder which is the principal component and other oxygen absorber components, and the mixture is then granulated for use.

As the moisture carrier, the diatomaceous earth in accordance with the present invention, should have a large pore volume of 0.1 ml/g or more and preferably of 0.3 ml/g or more.

Furthermore, the diatomaceous earth should have high water vaporization capability so that the moisture retained in the diatomaceous earth serving as the moisture donor may be efficiently consumed during oxygen absorption. Therefore, diatomaceous earth with a pore diameter in a range of 500 to 10,000 nm and high pre density is preferred. In such a case, a pore with a pore diameter of less than 500 nm may not be effective because the effectivness of the donor in the transformation of the retained moisture into a vapor is low. Alternatively, a pore with a pore size of more than 10,000 nm may not be able to retain moisture when the oxygen absorber is applied to a foodstuff with a high moisture content, resulting in wetting, rust and the like on the surface of the packaging material. Thus, such oxygen absorbers are not sufficiently effective.

The specific surface area of diatomaceous earth is preferably in a range of 0.1 to 100 $m^2/g$ and more preferably in a range of 1 to 50 $m^2$.

In order to suppress hydrogen generation during the storage of an oxygen absorber with a principal component of iron powder, the diatomaceous earth should have as low an ion exchange potential as possible and it should be possible to adjust its pH by the addition of a small amount of an alkali substance. Specifically, diatomaceous earth having a cation exchange volume of 50 meq/100 g or less may be used.

In accordance with the present invention, a moisture donor can be produced by immersing diatomaceous earth having an adsorptivity characterized by an equilibrium humidity of 55% or more at a moisture content of 2% in water or a variety of humidifying agents such as an aqueous solution of a halogenated metal, or an aqueous alcohol solution thereof or the like.

The water retention volume should be in a range of 45 to 250 parts, and preferably 50 to 200 parts, by weight of water to 100 parts by weight of diatomaceous earth. The humidity characteristic of the moisture donor is preferably adjusted to an equilibrium humidity of 55% or more so as to assure an appropriate oxygen absorption rate.

The method for producing the oxygen absorber of the present invention will now be explained. According to the present invention, any method is satisfactory as long as such method can effectively make use of the properties of diatomaceous earth, by means of iron powder, an oxidation accelerating agent, a filler and diatomaceous earth having an adsorptivity characterized a equilibrium humidity of 55% or more at a moisture content of 2%. The present method is not specifically limited to the following method.

For example, in one method, the principal component of an oxygen absorber, in this case, comprising iron powder, and the moisture donor, in this case comprising diatomaceous earth, are prepared separately.

An oxygen absorber principal agent is produced by firstly mixing iron powder with an aqueous halogenated metal solution as the oxidation accelerating agent, whereby the iron powder is coated with the halogenated metal and thereafter mixing a filler such as activated charcoal and the like with the iron powder thus obtained. The principal component of the oxygen absorber may also be produced by just mixing iron powder, a powdered oxidation accelerating agent and a filler. Alternatively, a moisture donor is produced by adding water or an aqueous halogenated metal solution to the diatomaceous earth having the aforementioned adsorptivity, then coating it onto or mixing it with a filler such as activated charcoal, the hydroxide of an alkaline earth metal such as calcium hydroxide, and the like, if necessary, to prepare the moisture donor. To prepare the oxygen absorber package, the principal component of the oxygen absorber and the moisture donor are mixed together and the resulting mixture is filled and packaged in a gas-permeable packaging material.

In such a production method, the principal component of the oxygen absorber and the moisture donor preferably have adequate fluidity for automatic filling and packaging, while iron powder and diatomaceous earth, each in granule form, are used.

Furthermore, a method is also possible, whereby iron powder, an oxidation accelerating agent, diatomaceous earth, a filler, an alkali substance and the like are mixed together, the resulting mixture is immersed in water or a humidifying agent to adjust the humidity, and the mixture is thereafter compression molded and made into granules to obtain an oxygen absorber.

The oxygen absorber of the present invention is generally packaged in a gas-permeable material for use as an oxygen absorber package.

As such a gas-permeable material, a material having an appropriate oxygen permeability and an appropriate water-vapor permeability and, that is capable of repelling water or oil if necessary, is selected. Specifically, such packaging material is composed of such materials as, for example paper, plastic film, non-woven fabric, and microporous film. If necessary, laminated materials and porous materials are also used.

Preferably, the gas-permeable material has an oxygen permeability of 5,000 to 5,000,000 ml/m$^2$ and a water-vapor transmission ratio of 1 to 5,000 ml/m$^2$·atm·Day.

BRIEF DESCRIPTION OF THE DRAWINGS

FIG. 1 depicts the relation between moisture content and equilibrium humidity in calcined marine diatomaceous earth, non-calcined marine diatomaceous earth, and one type of zeolite.

BEST MODES OF CARRYING OUT THE INVENTION

The present invention will now be explained in detail with reference to the following examples. However, the present invention is not limited to them.

EXAMPLE 1

Diatomaceous earth derived from Bacillariophyceae of species coscinodiscus of genus Amime Bacillariophyceae was wet granulated and calcined at 800° C. to prepare granular diatomaceous earth having a granule size of 0.1 to 1.5 mm. According to the following method, the moisture content and equilibrium humidity of the calcined granular diatomaceous earth in which aqueous saturated sodium chloride solution was retained was measured.

Six samples were prepared, by separately adding 0.05, 0.08, 0.1, 0.2, and 0.5 g of aqueous saturated sodium chloride solution to 5 g each of the calcined granular diatomaceous earth for the first five samples and adding no aqueous saturated sodium chloride solution to the sixth sample. The moisture activity (equilibrium humidity in %) of each sample was measured with a moisture activity meter. Also, each of the samples was dried in a thermostat adjusted to 120° C.±5° C. for 15 hours, and the moisture content of each of the samples was calculated from the loss on drying. The results are shown in FIG. 1, as a relation between moisture content and equilibrium humidity.

Comparative Example 1

Diatomaceous earth derived from Bacillariophyceae of species Coscinodiscus of genus Amime Bacillariophyceae was wet granulated and dried, without calcining, and a granule size of 0.1 to 1.5 mm was obtained. The moisture content and equilibrium humidity thereof were measured when aqueous saturated sodium chloride solution was contained in the diatomaceous earth according to the same method as in Example 1. The results are shown in FIG. 1.

Comparative Example 2

The relation between moisture content and equilibrium humidity for a zeolite with a granule size of 0.5 to 1.5 mm which was also used in the oxygen absorber of Comparative Example 4, was examined as in Example 1.

Six samples were prepared, the first five by individually adding 0.05, 0.08, 0.1, 0.2, and 0.5 g of aqueous saturated sodium chloride solution to 5 g each of the zeolite in granular form and the sixth by adding no aqueous saturated sodium chloride solution to the same zeolite. The moisture activity (equilibrium humidity, %) and moisture content of each sample were measured as in Example 1, and the results are shown in FIG. 1.

From FIG. 1, the granular diatomaceous earth obtained by calcination at 800° C., in accordance with the present invention, shows a equilibrium humidity of 60% or more at a moisture content of 1% or more. This indicates that at such a low moisture content as about 1%, the calcined granular diatomaceous earth has a humidity sufficient for the effective functioning of an oxygen absorber; in other words, the oxygen absorber can generate water in vapor.

On the contrary, granular zeolite should have a moisture content of 7% when it exibits a equilibrium humidity of 60% or more, and even non-calcined diatomaceous earth requires an approximately identical moisture content to that of zeolite.

This indicates that diatomaceous earth can serve as an excellent moisture donor for oxygen absorbers, and that such performance by diatomaceous earth can be imparted through calcination.

EXAMPLE 2

After adding 2 g of a 50 wt % calcium chloride solution to 100 g of iron powder prior to thorough mixing, the resulting mixture was dried in a dryer to prepare a halogenated metal-coated iron powder. The moisture content thereof was at 5 wt % or less according to the measurement on the basis of the loss after 12-hr drying, and the apparent density thereof was 2.7 g/ml.

One hundred grams of an aqueous 25% sodium chloride solution were added to and mixed with 100 g of the diatomaceous earth calcined at 800° C., prepared in Example 1. The aqueous sodium chloride solution in its entirety was retained in the diatomaceous earth, which was consequently dry and smooth (water retention volume of 75 g/100 g). It was confirmed that the diatomaceous earth could retain satisfactory fluidity during the following water retention test.

1 g of powdered activated charcoal of 100 mesh or less was mixed with the diatomaceous earth carrying the aqueous sodium chloride solution to cover its surface, and the resulting mixture served as the moisture donor. The apparent density of the activated charcoad was 0.75 g/ml.

The moisture donor (0.75 g) comprising the resulting granular diatomaceous earth carrying aqueous sodium chloride solution and having its surface coated with powdery active charcoal was mixed with 1 g of the halogenated metal-coated iron powder, and the resulting mixture was sealed in a paper bag laminated with porous polyethylene film, which served as the oxygen absorber package.

The oxygen absorber package was sealed along with 2 liters of air in a bag with an outer package of K-coat nylon/polyethylene laminated film, and maintained at 25° C. Seventy-two hours later, the oxygen concentration inside the bag was analyzed. The oxygen concentration was 8%. The oxygen absorption by the oxygen absorber (1 g of the halogenated metal-coated iron powder) was calculated to be 283 ml in volume. Furthermore, no specific abnormal appearance in the packaging material of the oxygen absorber was observed.

Fluidity test

According to the following method, the relation between the water retention volume and the fluidity of a carrier was examined to evaluate the water retentiveness of the carrier. A given amount of water was added to and mixed with 100 g of a carrier to prepare a water retentive agent.

The prepared water retentive agent was charged in a glass funnel from which the stem had been cut which was placed on a flat table to close the lower outlet. On lifting up the stemless glass funnel containing the water retentive agent, thereby taking the lower outlet away from the table, fluidity was determined on the basis of whether or not the retentive agent in the funnel was able to flow out and fall smoothly from the lower outlet. According to this method, the maximum water addition volume at which the water retentive agent can flow smoothly and maintain the fluidity without any cessation of flow of the retentive agent following the increase in the amount of water to the carrier or without any clogging of the agent during the flow, was designated as the water retention volume of the carrier.

As such a carrier, a carrier with good water retentiveness should be defined as the one having a large water retention volume and a good fluidity as a water retentive agent, namely, a larger water retention volume.

Comparative Example 3

Diatomaceous earth derived from Bacillariophyceae of species coscinodiscus of genus Amime Bacillariophyceae was simply wet granulated and dried, and the resulting diatomaceous earth was calcined at 1500° C. and a granule size of 0.1 to 1.5 mm was obtained. To 100 g of the granular diatomaceous earth was added 100 g of an aqueous 25% sodium chloride solution. However, about 50% of the aqueous sodium chloride solution added was not absorbed but remained separate. The granular diatomaceous earth containing the sodium chloride solution was sticky, so no examination was done for fluidity.

Comparative Example 4

To the zeolite having a granule size of 0.5 to 1.5 mm, was added 100 g of an aqueous 25% sodium chloride solution and these were mixed. However, about 50% of the added aqueous sodium chloride solution was not retained in the zeolite, but remained separate as a liquid. According to the water retentivity test, the water retention volume of granular zeolite having a granular size of 0.5 to 1.5 mm was 40 g of an aqueous 25% sodium chloride solution to 100 g of the granular zeolite (the water retention volume of the granular zeolite was 30 g/100 g).

After making 100 g of the granular zeolite having a granular size of 0.5 to 1.5 mm retain 40 g of aqueous sodium chloride solution and thereafter mixing 1 g of powdery activated charcoal of 100 mesh or less with the resulting zeolite for surface coating, a moisture donor was obtained. The apparent density thereof was 0.8 g/ml.

The moisture donor (0.8 g) comprising the granular zeolite carrying aqueous sodium chloride solution having its surface coated with powdered activated charcoal was mixed with 1.0 g of the same halogenated metal-coated iron powder as in Example 2, and was then sealed into a paper package laminated with porous polyethylene film, which was defined as an oxygen absorber package.

The oxygen absorber package was sealed along with 2 liters of air in a bag with an outer package of K-coat nylon/polyethylene laminated film, and maintained at 25° C. Seventy-two hours later, the oxygen concentration inside the bag was analyzed. The oxygen concentration inside the bag was 13%. The oxygen absorption by the oxygen absorber (1 g of the halogenated metal-coated iron powder) in such case was 184 ml.

In this case, 1.3 g of the moisture donor comprising the granular zeolite was needed so as to decrease the oxygen concentration down to the same level as in Example 2.

Comparative Example 4 had far worse results than those in Example 2, when an identical volume of the moisture donor was used with the same volume of iron powder as in Example 2. This is not only because of the difference in water retention volume between granular zeolite and burning-processed granular diatomaceous earth, but also because the water content of the granular zeolite that does not contribute to oxygen absorption is about 7%.

EXAMPLE 3

0.08 g of an aqueous saturated sodium chloride solution was added to 5 g of the granular diatomaceous earth having a granule size of 0.5 to 1.5 mm through calcining process as in Example 1, to prepare a moisture donor (moisture concentration of 1.5 wt %). One gram of this moisture donor and 1 g of the halogenated metal-coated iron powder were mixed together, and the resulting mixture was sealed in a paper bag laminated with porous polyethylene film which served as an oxygen absorber package.

The oxygen absorber package was sealed along with 100 milliliters of air in a package bag with an outer package of K-coat nylon/polyethylene laminated film, and maintained at 25° C. Twenty-four hours later, the oxygen concentration inside the bag was analyzed. The oxygen concentration was 0.1% or less.

Comparative Example 5

0.08 g of an aqueous saturated sodium chloride solution was added to 5 g of the granular zeolite of a granule size of 0.5 to 1.5 mm, to prepare a moisture donor (moisture concentration of 6.1 wt %). One gram of the moisture donor and 1 g of the halogenated metal-coated iron powder of Example 2 were mixed together, and the resulting mixture was sealed in a paper bag laminated with porous polyethylene film, which was served as oxygen absorber package. The oxygen absorber package was sealed along with 100 milliliters of air in a package of K-coat nylon/polyethylene laminated film, and maintained at 25° C. Twenty-four hours later, the oxygen concentration inside the bag was analyzed. The oxygen concentration was 20.8% or less.

In Example 3, the water content of the processed diatomaceous earth was 1.5% with satisfactory oxygen absorption, but in Comparative Example 5, the water content of the zeolite was 6.1%. Nevertheless with no oxygen absorption occurred.

EXAMPLE 4

To 100 g of granular diatomaceous earth having a granular size of 0.5 to 1.5 mm obtained by calcination as in Example 1, was added 100 g of an aqueous 25% sodium chloride solution, followed by the addition of 1 g of powdered activated charcoal of 100 mesh or less and 1 g of powdery magnesium hydroxide of 100 mesh or less for surface coating, to prepare a moisture donor. The apparent density thereof was 0.7 g/ml. Into 5 g of their moisture donor was added and suspended 100 g of pure water, the pH of the supernatant, was measured and found to be pH 9.5.

Ten grams of the moisture donor obtained by having the granular diatomaceous earth contain aqueous sodium chloride solution with thoroughly mixed together 10 g of the halogenated metal-coated iron powder, and the resulting mixture was sealed in a paper bag laminated with porous polyethylene, which served as the oxygen absorber.

The oxygen absorber package was sealed along with 25 milliliters of air in a bag on the outer surface of which aluminum had been chemically deposited, and kept at 35° C. Seventy-two hours later, the hydrogen concentration inside the bag was analyzed. The hydrogen concentration inside the bag was 0.2%.

Comparative Example 6

To 100 g of the granular zeolite having a granule size of 0.5 to 1.5 mm was added 100 g of an aqueous 25% sodium chloride solution, followed by addition of 1 g of powdered activated charcoal of 100 mesh or less and 1 g of powdery magnesium hydroxide of 100 mesh or less for surface coating, to prepare a moisture donor. The apparent density thereof was 0.8 g/ml. Into 5 g of the moisture donor was added and suspended 100 g of pure water, to measure the pH of the supernatant. The supernatant had a pH 8.5.

Ten grams of the moisture donor produced by making the granular zeolite containing aqueous sodium chloride solution and 10 g of the halogenated metal-coated iron powder of Example 2 were thoroughly mixed together, and the resulting mixture was sealed in a paper package laminated with porous polyethylene, which served as the oxygen absorber package.

As in Example 4, the oxygen absorber package was sealed along with 25 milliliters of air in a bag on the outer surface of which aluminum had been chemically deposited, and maintained at 35° C. Seventy-two hours later, the hydrogen concentration inside the bag was analyzed. The hydrogen concentration was 4.2% inside the bag.

EXAMPLE 5

One gram of the moisture donor prepared in Example 4 and 1 g of the halogenated metal-coated iron powder were mixed together, and sealed in a paper bag laminated with porous polyethylene, which served as the oxygen absorber package.

Inside a packaging bag laminated with K-coat nylon/polyethylene laminated film and containing 200 g of sponge cake was charged the oxygen absorber package and sealed along with 150 ml of air, which was then maintained at room temperature. One day later, the oxygen concentration inside the bag was measured. Absorption of oxygen was facilitated to an oxygen concentration of 0.01% or less. After continuing the storage of the sponge cake in this condition and then opening the seal for examination two weeks later, the quality of the sponge cake was observed to have remained good. No abnormal appearance was observed on the oxygen absorber package.

EXAMPLE 6

Diatomaceous earth derived from Bacillariophyceae of species Stephanodiscus of genus freshwater Bacillariophyceae was wet granulated and subjected to calcination at about 1,000° C., to prepare granular diatomaceous earth having a granule size of 0.1 to 1.5 mm. To 100 g of the resulting granular diatomaceous earth, was added 100 g of an aqueous 25% sodium chloride solution and these were mixed thoroughly. Thereafter the surface of the diatomaceous earth carrying an aqueous sodium chloride solution was coated with 1 g of powdered activated charcoal of 100 mesh or less. The apparent density thereof was 0.6 g/ml. One gram of a moisture donor comprising the granular diatomaceous earth derived from freshwater Stephanodiscus of genus Bacillariophyceae and 1 g of the halogenated metal-coated iron powder of Example 2 were thoroughly mixed together, and sealed in a paper bag laminated with porous polyethylene film, which served as the oxygen absorber package.

The oxygen absorber package was placed in a package bag of K-coat nylon/polyethylene laminated film, containing 200 g of sponge cake as in Example 5, and then sealed along with 150 ml of air inside the bag and maintained at room temperature. One day later, the oxygen concentration inside the bag was measured. Absorption of oxygen was facilitated to an oxygen concentration of 0.01% or less. After continuing the storage of the oxygen absorber and cake in this condition and then opening the seal for examination two weeks later, the quality of the sponge cake was observed to have maintained. However, slight oozing of the contents was observed on the outer surface of the oxygen absorber package.

The oxygen absorber of the present invention is an excellent oxygen absorber comprising iron powder, an oxidation accelerating agent, a filler and a moisture donor produced by adding water or a humidifying agent to diatomaceous earth so that it has an adsorptivity characterized by an equilibrium humidity of 55% or more at a moisture content of 2%.

The diatomaceous earth having such specific adsorptivity in accordance with the present invention has higher water retentivity and can generate water vapor satisfactorily at a lower moisture content, which adsorptivity cannot be observed in the conventional carriers, and can make the retained moisture effectively contribute to oxygen absorption. Additionally, the diatomaceous earth is inexpensive.

Therefore, employing diatomaceous earth as the moisture donor making up one component of an oxygen absorber, the amount of a carrier can be drastically reduced, so that an oxygen absorber with a higher oxygen adsorptivity per oxygen absorber volume can be prepared. Additionally, the oxygen absorber employing the diatomaceous earth of the present invention encourages good flavor retentiveness with less hydrogen generation and without causing wetting or exudation from a foodstuff with a high moisture content. Hence, the present oxygen absorber is excellent in terms of safety and hygiene.

According to the present invention, an oxygen absorber package can be prepared having a high oxygen adsorptivity with a small carrier content and being of a compact size for placement in any occasion, can be excellent in terms of safety and hygiene, is low in cost, and has excellent practical applicability. The oxygen absorber of the present invention can be applied preferably to a wide variety of foodstuffs in various fields for quality maintenance, including dry foodstuffs and foodstuffs with high-moisture content and articles likely to deteriorate in the presence of oxygen, such as pharmaceutical agents and the like.

What is claimed is:

1. An oxygen absorber comprising:
   iron powder;
   0.01 to 20 parts by weight of an oxidation accelerating agent, based on 100 parts by weight of said iron powder;
   a filler; and
   a moisture donor including granular diatomaceous earth calcined at a temperature of 500° to 1500° C. and having an adsorptivity characterized by an equilibrium humidity of at least 55% at a moisture content of 2% by weight wherein said granular diatomaceous earth is produced using powdery diatomaceous earth extruded and granulated with moisture and calcined at 500° to 1500° C. so that said granular diatomaceous earth is fluid for pouring into a gas-permeable packing material.

2. An oxygen absorber according to claim 1, wherein the temperature for calcining is 650° to 1,300° C.

3. An oxygen absorber according to claim 1, wherein the diatomaceous earth has a pore volume of 0.1 ml/g or more.

4. An oxygen absorber according to claim 1, wherein the diatomaceous earth is of a specific surface area in a range of 0.1 to 100 $m^2/g$.

5. An oxygen absorber according to claim 1, wherein the diameter of the fine pores of the diatomaceous earth ranges from 500 to 10,000 nm.

6. An oxygen absorber according to claim 1, wherein the cation exchange potential of the diatomaceous earth is 50 meq/100 g or less.

7. An oxygen absorber according to claim 1, wherein the diatomaceous earth has a water retentiveness of 45 g or more of water per 100 g of the diatomaceous earth.

8. An oxygen absorber according to claim 1, wherein the granule size of the granular diatomaceous earth is 0.2 to 3 mm.

9. An oxygen absorber according to claim 1, wherein the oxidation accelerating agent is selected from the group consisting of a halogenated product of alkali metals or alkaline earth metals, a halogenated product of ion exchange resins, a hydrochloric acid, a hypochlorite, or mixtures thereof.

10. An oxygen absorber according to claim 1, wherein the oxygen absorber is packaged with a gas-permeable material comprising paper, plastic film, non-woven fabric, and microporous film and having an oxygen permeability of 5,000 to 5,000,000 $ml/m^2$ atm day and a water-vapor permeability of 1 to 5,000 $ml/m^2$ atm day.

11. An oxygen absorber according to claim 1 wherein the filler is at least one substance selected from the group consisting of activated charcoal, potassium carbonate, pearlite, zeolite, activated alumina, oxidized iron, alkaline earth metal oxides and gypsum.

12. An oxygen absorber according to claim 1 wherein the diatomaceous earth has a pore volume of at least 0.3 ml/g.

13. An oxygen absorber according to claim 1 wherein the diatomaceous earth has a surface area of 1 to 50 $m^2/g$.

14. An oxygen absorber according to claim 1 wherein the granule size of the diatomaceous earth is 0.5 mm to 2 mm.

15. An oxygen absorber according to claim 1, wherein said moisture donor is produced by adding water or an aqueous solution to diatomaceous earth.

16. An oxygen absorber according to claim 15, wherein the aqueous solution is an aqueous solution or an aqueous alcohol solution of a halogenated metal.

17. An oxygen absorber according to claim 1, wherein the diatomaceous earth is a marine diatomaceous earth.

18. An oxygen absorber according to claim 17, wherein the marine diatomaceous earth is diatomaceous earth derived from species coscinodiscus of genus Bacillariophyceae.

19. An oxygen absorber according to claim 1, wherein the diatomaceous earth is coated with the filler.

20. An oxygen absorber according to claim 19, wherein the filler is an alkaline earth metal hydroxide.

21. A method for producing an oxygen absorber comprising, increasing the moisture content of calcined diatomaceous earth to have an equilibrium humidity of 55% or more at a moisture content of 2% weight to prepare a moisture donor; and further adding iron powder, an oxidation accelerating agent, and a filler.

22. A production method according to claim 21, wherein the diatomaceous earth is calcined between 500° C. and 1,500° C.

23. A production method according to claim 21, wherein the oxidation accelerating agent is added separately to the moisture donor and the iron powder.

24. A production method according to claim 21, wherein the moisture content of the diatomaceous earth is increased by adding water or an aqueous solution to diatomaceous earth.

25. A production method according to claim 21, wherein the raw diatomaceous earth is generated from the deposition of at least one of marine diatomaceous earth and freshwater diatomaceous earth and is ground, dried, and calcined.

26. A production method according to claim 21, wherein the diatomaceous earth is granulated.

27. A production method according to claim 21, wherein the diatomaceous earth is mixed with iron powder, an oxidation accelerating agent and a filler prior to granulation.

28. A production method according to claim 21, wherein iron powder is mixed with an oxidation accelerating agent, thereby coating the iron powder with the oxidation accelerating agent prior to mixing with a filler, and wherein the resulting mixture is subsequently mixed with a moisture donor.

29. A production method according to claim 21, wherein in iron powder, an oxidation accelerating agent, a filler and a moisture donor are all mixed.

* * * * *